Oct. 6, 1959 S. M. LAIRD 2,907,501
DISCHARGE AND MIXING DEVICE
Filed Jan. 23, 1958 2 Sheets-Sheet 1

INVENTOR.
STANLEY M. LAIRD
BY
*Walter C. Fehr*
ATTORNEY

Oct. 6, 1959 S. M. LAIRD 2,907,501
DISCHARGE AND MIXING DEVICE
Filed Jan. 23, 1958 2 Sheets-Sheet 2
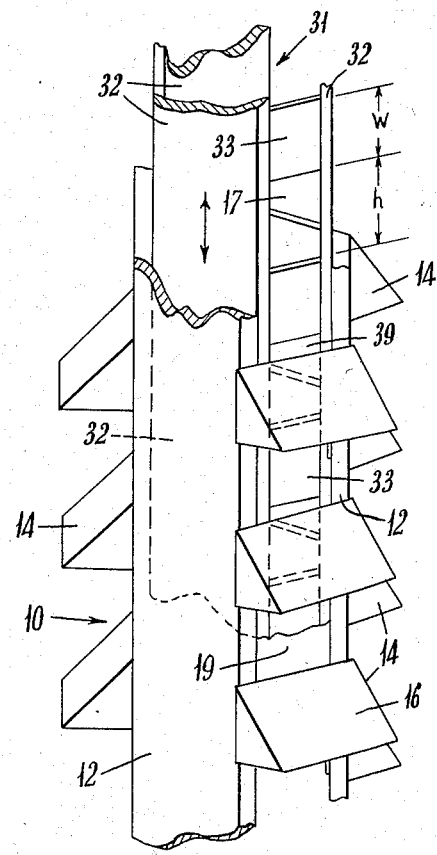
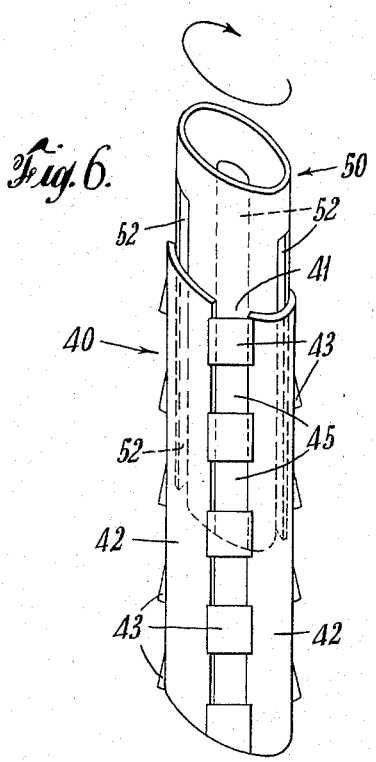
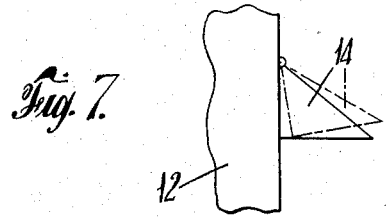
INVENTOR.
STANLEY M. LAIRD
BY
*Walter C. Kehm*
ATTORNEY

United States Patent Office 2,907,501
Patented Oct. 6, 1959

2,907,501

DISCHARGE AND MIXING DEVICE

Stanley M. Laird, Bound Brook, N.J., assignor to Union Carbide Corporation, a corporation of New York Application January 23, 1958, Serial No. 710,671

5 Claims. (Cl. 222—485)

This invention relates to apparatus for handling particulate materials and more specifically to an apparatus for obtaining proportionally blended particulate material from a stratified source of supply.

Particulate material, especially resins such as polyethylene, which are not immediately required for use when received from a supplier, are ordinarily placed in a storage bin, or hopper. Such hoppers are usually many times larger than a normal shipment of material. The physical characteristics of resin materials vary significantly from shipment to shipment. Hence, the material present in the hopper is stratified, each layer possessing different physical characteristics from the layers immediately above and below it. These layers may also differ in thickness and may contain material of varying particle sizes.

Because the hopper outlet is ordinarily at the bottom of the hopper, each portion of material issuing therefrom comes almost exclusively from the layer immediately adjacent to this outlet. Such a portion is not at all representative of the overall contents of the hopper. Consequently, successive portions of material drawn from the hopper differ, oftentimes to a degree sufficient to cause undesirable variations in processing and end-product quality.

Methods used heretofore to obtain a substantially representative portion of the overall contents of a hopper at the outlet thereof have been found to be either uneconomical or unsatisfactory. In one method, the entire contents of the hopper are discharged, blended and returned to the hopper. This method requires costly blending equipment and necessitates a multiplicity of handling operations.

Another method used heretofore mixes the contents of the bin in situ. However, even when deep flight screws and long mixing times, on the order of 2 hours, are employed, blending results are still unsatisfactory. Only a minor fraction of the material is mixed and variations in the sizes and shapes of the particles cause a sorting action to occur.

It is an object of the present invention to provide an apparatus for the delivery of particulate material simultaneously and proportionally from all levels of a bin or hopper.

Another object of the present invention is to provide a means for obtaining from the outlet of a hopper a portion of material whose composition is proportioned to the overall contents of the hopper.

In the drawings, Figure 1 is an elevational view, partly broken away, of a hopper provided with the proportional discharge chute;

Figure 5 is a view of the discharge chute with a valve means slidably mounted therein;

Figure 6 is a view of the proportional discharge chute with a valve means rotatably mounted therein; and Figure 7 is a partial view of the proportional discharge chute showing a deflector pivotally mounted thereon.

Figure 1:
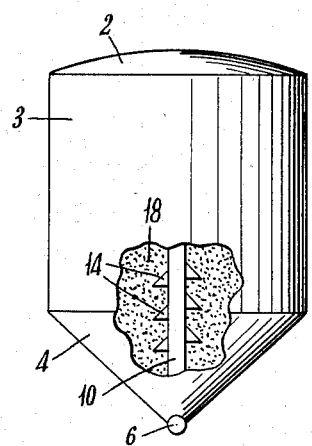

The typical hopper structure shown in Figure 1 is illustrative of applications to which this proportional discharge chute may be advantageously put. This hopper comprises a top 2, a vertical cylindrical side wall 3, and a conical bottom member 4 which is tapered to an outlet 6 provided with closure means.

Surrounding the outlet 6 and extending upwardly into the hopper 2 is a proportional discharge chute 10 the main portion of which is completely encircled by the members 3 and 4. In the space between these members 3 and 4 and the chute 10 there is disposed particulate material 18.

Figure 3:
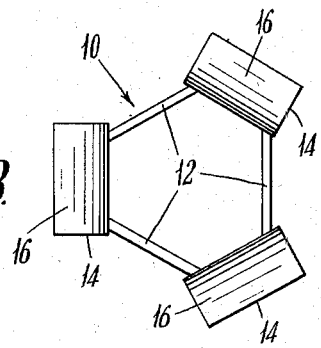
Figure 3 is a plan view of the chute shown in Figure 2.
Figure 2:
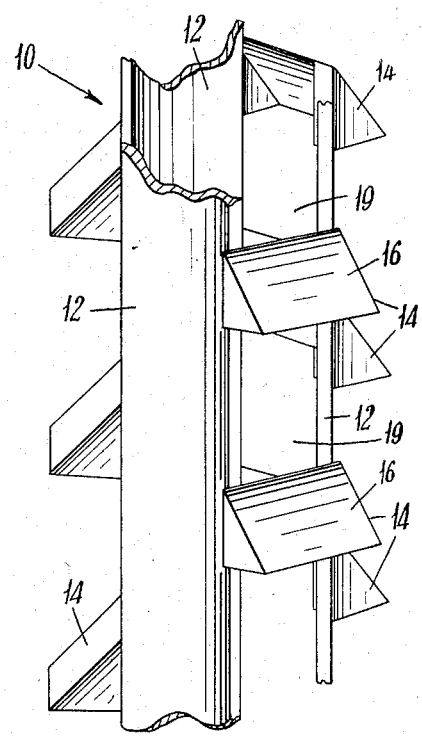
Figure 2 is an enlarged view of a portion of the preferred embodiment of the proportional discharge chute.

As shown in Figures 2 and 3 the proportional discharge chute 10 comprises elongated members 12 adjacent pairs of which are held together by the deflectors 14 to define a substantially vertical chute. The upper surfaces 16 of these deflectors 14 are inclined to render them self-cleansing. The members 12 are transversely spaced apart, and the deflectors 14 extend perpendicularly across the spaces therebetween and divide them into openings 19 through which material 18 can pass into the chute. The size and shape of the deflectors 14 determines what size openings 19 are necessary to provide a satisfactory flow of material into the chute.

Figure 4:
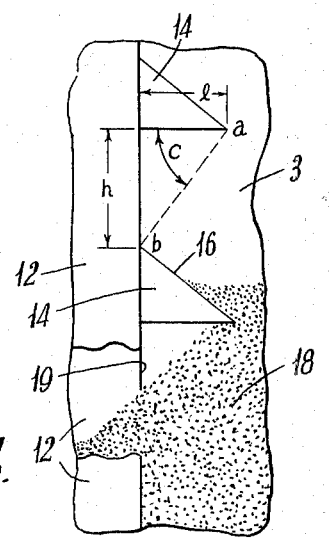
Figure 4 is a partial view of the discharge chute showing particulate material entering thereinto.

In Figure 4, the opening 19 extending between deflectors 14 has a height $h$. The lower edge of the deflector 14 has a length $l$. The ratio of the height $h$ to the length $l$ is the tangent of an angle $c$.

It is critical in the present invention that the angle $c$, thus defined, exceed the angle of repose of the material in the hopper.

Or, expressed in terms of the tangents of the angles, the tangent of the angle $c$ must exceed the tangent of the angle of repose of the material disposed about the chute for the apparatus of the present invention to function satisfactorily. The angle of repose of a material is defined as the angle of maximum slope, usually measured from the horizontal, at which a heap of any loose solid material will stand without sliding.

Thus it is seen that there is a critical relation between the distances $l$ and $h$ or the outward extension of the deflector and the size of the opening, and the angle of repose of the material within the hopper. The greater the difference between the smaller angle of repose or the tangent thereof and the larger angle $c$ or the tangent thereof the more rapid will be the flow of material into the chute. Conversely, an increase in the angle of repose or its tangent so that it exceeds the angle $c$ or its tangent will result in no flow of material. The angle of repose of a given material is characteristic thereof and depends essentially upon the density of the material, the size of the particles, and the condition of the surface of the particles e.g. degree of roughness, wetness, etc.

In Figure 5 the proportional discharge chute 10 is shown with valve or closure means 31.

In this embodiment the valve 31 is congruent with and slidably mounted within the discharge chute 10 and is substantially equal in length thereto. The valve 31 comprises a plurality of substantially vertical elongated members 32 fixed in spaced relation by a plurality of transversely mounted vertically-spaced cross-pieces 33. The cross-pieces 33 extend vertically a distance $w$ and extend perpendicularly across the space between the members 32. Each cross-piece 33 is separated from those immediately above and below it by an opening 17 having a height $h$.

In this embodiment, the vertical extension $w$ of successive cross-pieces 33 is substantially equal to the height $h$ of the opening 17 therebetween. The valve 31 is slidably mounted within the chute 10 and is vertically movable therein a distance equal to the vertical extension $w$ of the cross-piece 33. The alignment of the openings 17 of the valve 31 with the openings 19 of the mixing chute 10 provides ports 39 through which particulate material can pass. A vertical adjustment of the valve 31 blocks the openings 19 of the chute 10 with the cross-piece 33, thus closing port 39 and preventing the entrance of material therethrough. In Figure 6, a plurality of elongated wall members 42 are arranged in spaced relation to define a substantially vertical chute 40. These wall members 42 are positioned with relation to one another to provide longitudinal slots 41 and are secured to one another by vertically spaced deflectors 43 which are placed perpendicularly across the longitudinal slots 41 and vertically spaced to provide a plurality of openings 45. Concentric with and rotatably mounted within the mixing chute 40 is a valve 50 comprising a cylindrical wall section having a length substantially equal to the length of the mixing chute 40. The cylindrical wall section has a plurality of longitudinal openings 52 therein, the number of such openings corresponding to the number of longitudinal slots 41 of the mixing chute 40. The openings 52 in the valve 50 are substantially equal in length and width to the longitudinal slots 41 of the mixing chute 40.

In Figure 6, the openings 52 in the cylindrical wall section 50 of the valve are not aligned with the longitudinal slots 41 of the mixing chute. Rotation of the valve 50 to align the openings 52 with the slots 41 provides ports for the entrance of particulate material.

In Figure 7, the deflector 14 is shown pivotally mounted on the member 12. The deflector can be locked in several positions, two of which are shown, to facilitate flow of materials.

It is not critical that the chute be situated in the center of the storage bin as shown in Figure 1. It can, if desired, be placed in any other part of the hopper provided that the longitudinal axis of the chute remain substantially vertical.

Likewise, a number of chutes can be used in any one hopper if desired and can be similar or different in construction details, such as angle of deflector surfaces. With a number of chutes in a hopper material can be selectively withdrawn from particular levels and areas of the hopper.

A wide variety of chute designs and structure types are within the scope of this invention. The chute can be made from any rigid self-sustaining material and is operable in storage structures of all sizes and shapes which have outlets for their contents at or near the bottom. The apparatus of this invention is very simple in design and can be easily and inexpensively installed. Additional advantages of the proportional discharge chute of this invention are that there is no need of constantly replenishing the hopper at the top to insure successful operation, nor is there a need for all layers to be equal in thickness.

The elongated members which define the chute are not restricted as to their shape or size except that when secured to one another to form a chute they must provide both openings into the chute along the length thereof and a substantially unobstructed area with the chute itself. There can be any number of these openings and they can be of any geometrical shape which is large enough to permit particulate material to pass through.

It is critical that the chute be provided with a plurality of deflectors, otherwise proportional blending of quantities of the particulate material distributed in layers throughout the hopper, simultaneous with discharge thereof, as provided by the present invention, cannot be obtained. These deflectors, the ends of which can be enclosed, are made of a rigid material and are placed immediately above the openings in the chute to relieve the head pressure of the material in the hopper from the material immediately adjacent to the openings. They can be permanently fixed on the elongated members or can be hinged to pivot from the attached edge. Alleviation of direct downward pressure is required for the smooth flow of material into the chute from all layers, which is necessary if material from the different layers is to be blended in amounts proportional to the thickness of each layer. As will be realized each of these deflectors can be at virtually any angle with reference to the longitudinal axis of the chute provided the downward pressure on the material adjacent to the openings is relieved. The outlet at the bottom of the hopper should be of sufficient size to provide rapid removal of material thereby ensuring a free fall space within the chute when the closure means, e.g. a valve, is opened.

What is claimed is:

1. A proportional discharge device comprising a hopper with particulate material disposed therein, an outlet at the bottom of said hopper, an elongated member extending upwardly in said hopper and defining a chute communicating with said outlet and having a plurality of entrance means spaced therealong, a deflecting device outwardly extending from said elongated member above each of said entrance means, the ratio of the outward extension of the deflecting device to the vertical extension of the entrance means therebelow being numerically greater than the tangent of the angle of repose of said particulate material whereby said particulate material surrounding the entrance means in said chute falls therethrough unimpeded by material above said deflecting device.

2. Means for proportionately discharging particulate material from a hopper having an outlet at the bottom comprising a plurality of laterally spaced elongated members defining a chute communicating with said outlet, a plurality of vertically spaced deflecting means fixed to the opposing edges of adjacent elongated member to maintain said elongated members in laterally spaced relation, successive deflecting means being spaced a distance $h$ and extending outwardly from the plane of said opposing edges a distance $l$, the distance $h$ and $l$ being such that their ratio is numerically greater than the tangent of the angle of repose of particulate material disposed under said deflecting means.

3. Apparatus as claimed in claim 1 wherein a congruent valve is provided comprising an elongated member extending upwardly in the chute and having an opening therein at least equal in size to the entrance means in said chute, said valve being capable of axial rotation to alternately place said opening in and out of register with said entrance means.

4. Means for proportionately discharging particulate material from a hopper having an outlet at the bottom comprising a plurality of laterally spaced elongated members defining a chute communicating with said outlet, a plurality of vertically spaced deflecting means pivotally mounted on the opposing edges of adjacent elongated members to maintain said elongated members in laterally spaced relation, successive deflecting means being spaced a distance $h$ and extending outwardly from the plane of said opposing edges a distance $l$, the distance $h$ and $l$ being such that the ratio of the former to the latter is numerically greater than the tangent of the angle of repose of particulate material disposed under said deflecting means.

5. Apparatus as claimed in claim 3 wherein positioned within the chute are a plurality of laterally spaced elongated members fixed in spaced relation by a plurality of vertically spaced cross-pieces extending between opposing edges of adjacent elongated members to form said valve congruent with said chute, said valve being vertically slidable within said chute, said cross-pieces extending vertically a distance which is equal to said distance.

(References on following page)

References Cited in the file of this patent

UNITED STATES PATENTS

| | | |
|---|---|---|
| 413,720 | Henderson | Oct. 29, 1889 |
| 670,222 | Campbell | Mar. 19, 1901 |
| 699,621 | Humphreys | May 6, 1902 |
| 1,121,328 | Curtis | Dec. 15, 1914 |
| 2,315,915 | White | Apr. 6, 1943 |
| 2,598,388 | Hurter | May 27, 1952 |
| 2,741,464 | Conover | Apr. 10, 1956 |
| 2,805,802 | Strong | Sept. 10, 1957 |

FOREIGN PATENTS

| | | |
|---|---|---|
| 532,633 | Germany | Sept. 1, 1931 |